(12) United States Patent
Harpell

(10) Patent No.: US 6,311,783 B1
(45) Date of Patent: Nov. 6, 2001

(54) GARDENING TOOL

(76) Inventor: William Harpell, 2380 Findlay Road, Joyceville, Ontario (CA), K0H 1Y0

( * ) Notice: Subject to any disclaimer, the term of this patent is extended or adjusted under 35 U.S.C. 154(b) by 0 days.

(21) Appl. No.: 09/263,493

(22) Filed: Mar. 8, 1999

(51) Int. Cl.[7] ............................................. A01B 1/00
(52) U.S. Cl. ..................... 172/380; 172/371; 172/375; 30/353; 30/355
(58) Field of Search ..................... 172/371, 374, 172/375, 378, 379, 380, 381, 13, 16, 18, 19, 41, 42, 765, 772.5; 37/446; 294/51; 30/276, 357, 353, DIG. 5, 346, 355, 308.1

(56) References Cited

U.S. PATENT DOCUMENTS

| | | |
|---|---|---|
| 197,956 | 12/1877 | Walker . |
| 215,077 | 5/1879 | Stone . |
| B 284,427 | 1/1975 | Lucan . |
| 698,715 * | 4/1902 | Knight ................................. 172/378 |
| 838,417 * | 12/1906 | Jenkins ................................ 172/380 |
| 1,167,971 * | 1/1916 | Birn ..................................... 172/371 |
| 1,231,012 * | 6/1917 | Glover ................................. 172/371 |
| 1,239,653 | 9/1917 | Willard . |
| 1,240,199 | 9/1917 | Haas . |
| 1,545,229 | 7/1925 | Bartran . |
| 1,845,222 * | 2/1932 | Birn ..................................... 172/371 |
| 2,280,778 | 4/1942 | Anderson . |
| 2,969,120 * | 1/1961 | Randolph ............................ 172/371 |
| 3,293,674 | 12/1966 | Sapia . |
| 3,545,551 * | 12/1970 | Niemeyer ............................ 172/371 |
| 3,592,272 * | 7/1971 | Perez ................................ 172/380 X |
| 3,739,562 * | 6/1973 | McNamara ...................... 172/378 X |
| 3,942,591 * | 3/1976 | Brannin ............................... 172/371 |
| 4,110,921 * | 9/1978 | Poker, Jr. ............................... 37/446 |
| 5,004,053 | 4/1991 | Martell . |
| 5,077,961 * | 1/1992 | Schumacher, II et al. ............ 56/255 |
| 5,452,769 * | 9/1995 | Markert ........................... 172/378 X |
| 5,996,705 * | 12/1999 | Downs ................................ 172/371 |

FOREIGN PATENT DOCUMENTS

| | | | |
|---|---|---|---|
| 1069162 * | 11/1959 | (DE) | ..................................... 172/371 |
| 848007 * | 10/1939 | (FR) | ..................................... 172/371 |
| 174246 * | 1/1922 | (GB) | ..................................... 172/371 |

* cited by examiner

Primary Examiner—Victor Batson

(57) ABSTRACT

A cultivating tool having a blade made from steel sheet at least one-eighth of an inch thick. The blade has a front surface, a back surface, and at least one cutting edge. The blade is tapered from the cutting edge to the front surface to provide a wide, tapered, camming section and a relatively narrow cutting edge. The tapered, caiming section is at least one inch wide.

17 Claims, 3 Drawing Sheets

GARDENING TOOL

BACKGROUND OF THE INVENTION

1. Field of the Invention

This invention is directed toward an improved gardening tool. The invention is more particularly directed toward an improved gardening tool of the cultivating or hoe type.

2. Description of the Related Art Including Information Disclosed Under CFR §§1.97–1.99

Gardening tools of the hoe type are known. The simplest known hoe type tool has a generally rectangular blade with means for attaching a handle at the middle of the blade adjacent the top edge. The bottom edge of the blade is usually tapered to provide a cutting edge. It is known to provide variations of this known hoe construction. In one known variation, one short side of the rectangular blade could be pointed transforming the rectangular blade into a five sided blade. In another known variation, the rectangular hoe blade could be long and narrow in shape. One side of the blade, usually the long side, in any variation, could have triangular shaped teeth along its length. A short side of the blade could have one or more deep tapered slots forming weed root cutting teeth.

The known hoe type tools have a disadvantage however. All the known tools are made from relatively thin stock material, usually steel sheet about one-sixteenth of an inch thick. This thin sheet material prevents a wide taper from being put on the blade adjacent the cutting edge of the blade. If a wide taper were put on the thin blade, the cutting edge portion would be so thin as to be liable to bend during use which would ruin the hoe. A narrow taper however means that the cutting edge becomes dull quickly and thus makes the tool inefficient. The narrow taper also makes it more difficult for the blade to enter the earth. This makes it more difficult to use the hoe. When the blade does enter the earth, the narrow taper causes it to immediately split a clump of earth off the remainder of the earth. This action minimizes any self sharpening of the blade obtained by the blade passing through earth.

SUMMARY OF THE INVENTION

It is the purpose of the present invention to provide a hoe type gardening tool having a blade made from stock material at least one-eighth inch thick. The thicker blade allows a wider taper to be put on the section of the blade adjacent the cutting edge of the blade without making the cutting edge itself too thin which could weaken the blade adjacent the cutting edge. The wide taper is preferably at least one inch wide and is on the front side of the blade. The wide taper also allows the blade, when entering the earth, to relatively slowly cam a clump of earth away from the remainder of the earth, making operation of the hoe easier and more efficient. Since the blade also relatively slowly cams the clump of earth away from the remainder of the earth, the tapered section of the blade remains in contact with the earth for a longer period of time after entering the earth. This longer sliding contact with the earth results in the earth continuously honing the tapered surface to self-sharpen the blade to maintain a relatively sharp cutting edge.

In one embodiment of the invention, it may be desirable to have the blade, with the wide, tapered, camming section, formed with a sharp cutting edge. The sharp cutting edge may be needed to cut the roots of weeds. In this embodiment, the wide, tapered, camming section of the blade can have a second tapered section formed therein, the second tapered section extending from the cutting edge, for a distance substantially less than the width of the tapered camming section, to substantially narrow the cutting edge. The second tapered section can be formed with an angled surface on the front or back face of the hoe adjacent the cutting edge. The second, tapered cutting section, being relatively short compared to the width of the first, tapered, camming section, does not unduly weaken the blade adjacent the cutting edge while providing a more efficient cutting action with the narrower cutting edge.

The invention is particularly directed toward a cultivating tool of the hoe type having a blade made from steel sheet at least one-eighth of an inch thick. The blade has a front surface and a parallel back surface and at least one cutting edge between the surfaces. The blade is tapered from the cutting edge to the front surface to form a relatively wide, tapered, camming section and a relatively narrow cutting edge. Preferably the tapered surface on the camming section is at least one inch wide.

DESCRIPTION OF THE PREFERRED EMBODIMENTS

Figure 1:
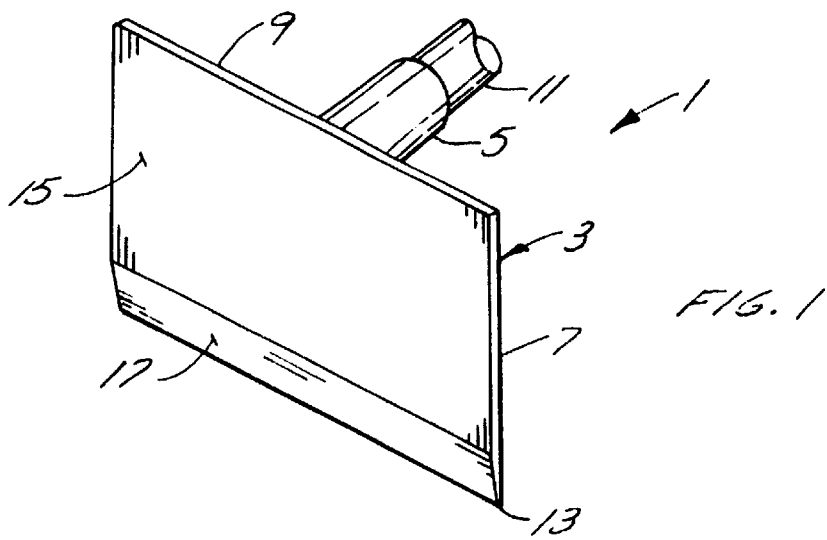
FIG. 1 is a perspective view of the cultivating tool.
Figure 2:
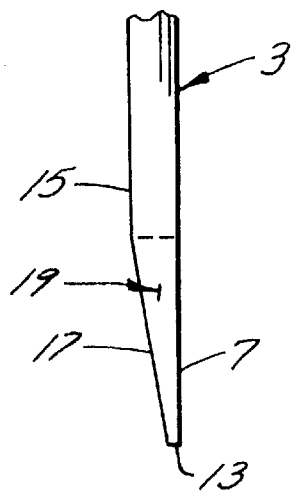
FIG. 2 is a detail side view of the blade of the tool.

The cultivating tool 1 of the present invention, as shown in FIGS. 1 and 2, has a blade 3 that is generally rectangular in shape. In accordance with the present invention, the blade 3 is formed from steel sheet that is at least one-eighth inch thick. A tubular member 5 can be attached to the middle of the back surface 7 of the blade 3, near its top edge 9. The tubular member 5 receives one end of the handle 11 of the tool. The bottom portion of the blade 3 is tapered upwardly from the bottom edge 13, adjacent the back surface 7 of the blade, toward the front surface 15. An angled surface 17 extends between the bottom edge 13 and the front surface 15 to form a tapered section 19 at the bottom of the blade 3. The tapered section 19 is at least one inch wide, measuring in a direction away from the bottom edge 13. The tapered section 19 forms the bottom edge 13 into a relatively sharp, narrow, cutting edge.

Figure 3:
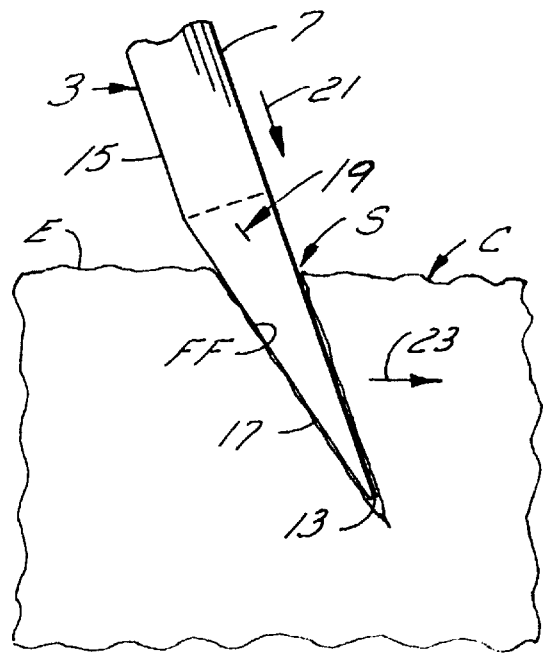
FIG. 3 is a side view showing the tool in use.

In use, the blade 3 of the cultivating tool 1 is struck into the ground, cutting edge 13 first, as shown in FIG. 3. As the blade 3 moves down into the earth E, as shown by the arrow 21, the tapered section 19 moves the back surface 7 of the blade 3, as shown by arrow 23, away from the front face FF of the slit S being made in the earth E by the entry of the blade 3. This camming action by the tapered section 19 helps to easily separate the clump of earth C behind the blade 3 from the remainder of the earth E in front of the blade. At the same time, as the blade 3 enters the earth, the remainder of the earth E in front of the blade grinds against the angled surface 17 of the blade maintaining a relatively sharp cutting edge 13.

Having the blade 3 made from material at least one-eighth inch thick allows the blade to have a wide, tapered, camming section 19 without having to narrow the cutting edge 13 to a very thin sharp point. The wide, tapered, camming section 19 allows the blade to cam the clump of earth easily away from the remainder of the earth as the blade enters the ground. The wide, tapered, camming section 19 also ensures constant contact of the earth on the front of the blade with the angled surface 17 to continually sharpen the blade during use.

Figure 4:
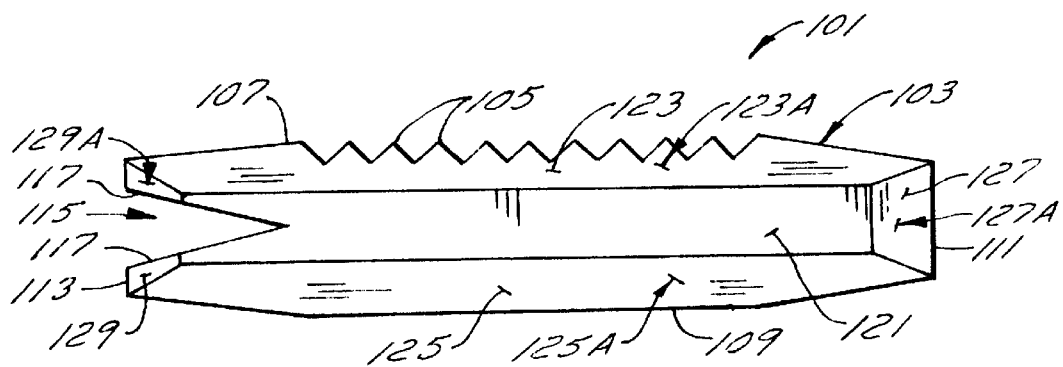
FIG. 4 is a perspective view of a cultivating tool with a narrow blade.

The blade shown in FIGS. 1 to 3 is a hoe type blade. The tool blade could have other shapes as well. For example, as shown in FIG. 4, the tool 101 can have a long, relatively narrow blade 103 with triangular teeth 105 on one long side 107 of the blade. The other long side 109 of the blade 103 can be relatively straight. One narrow end 111 of the blade can be straight and the other narrow end 113 can be deeply notched as shown by V-notch 115 to form long, somewhat pointed fingers 117.

The tool can be used to cut weeds using the long side 107 with the teeth 105 or using the tips of the teeth 105, to form shallow rows for planting. The long, straight side 109 of the blade can be used to hoe in wide areas while the narrow, straight side 111 can be used to hoe in narrow areas. The narrow, notched side 113 can be used to pull weeds.

In accordance with the present invention, the blade 103 is made from steel sheet at least one-eighth inch thick. This permits both the long sides 107, 109 and the short sides 111, 113 of the blade to be tapered providing the same advantages as set out above with respect to a conventional hoe-type blade shown in FIGS. 1 to 3. The blade 103 is tapered from each side for at least one inch on the front surface 121 of the blade, forming the sides into cutting edges. The wide, angled, surfaces 123, 125, 127 and 129, forming the camming sections 123A, 125A, 127A and 129A adjacent each side 107, 109, 111 and 113 respectively of the blade, allow for the sides to form strong, relatively sharp cutting edges. The camming sections also allow the blade to cam earth clumps away from the main body of earth no matter which side of the blade is being used making the blade more efficient during use. The wide tapered camming surfaces also help in maintaining the cutting edges relatively sharp.

Figure 5:
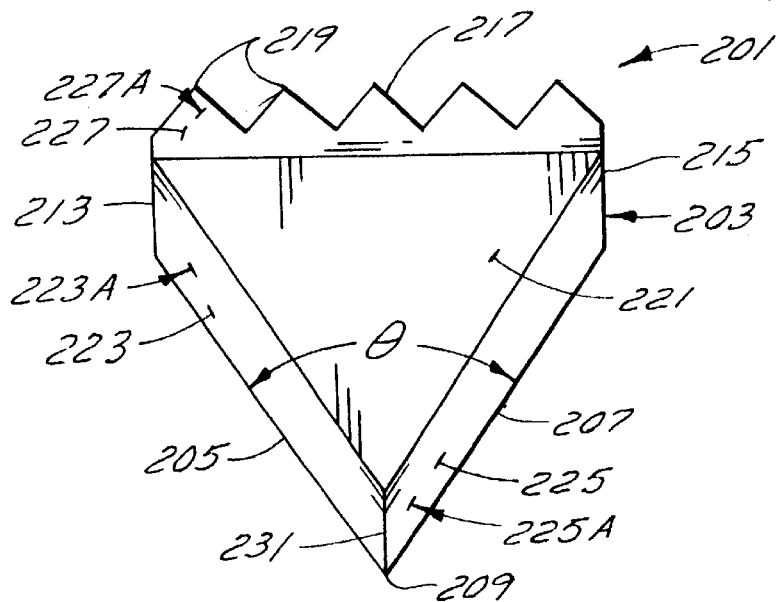
FIG. 5 is a perspective view of another cultivating tool with a generally triangular blade.

In another embodiment, as shown in FIG. 5, the tool 201 can have a generally triangular shaped blade 203 with two front sides 205, 207 of the blade 203 being straight and angled toward each other to form a sharp point 209 where they meet. The included angle φ between the sides 205, 207 can range between 45° and 90° but is preferably about 60°. Each front side extends from a relatively short back side 213, 215 respectively of the blade, the back sides 213, 215 being parallel. The back sides 213, 215 of the blade are joined by a back end 217. The back end 217 has triangular teeth 219 formed in it. This blade 203 is tapered on the front surface 221 from both front sides 205, 207 and from the back end 217, but not from the short back sides 213, 215, to form the front sides and back end into relatively narrow cutting edges. The angled surfaces 223, 225, 227 adjacent the sides 205, 207 and end 217 respectively are at least one inch wide and form tapered sections 223A, 225A and 227A respectively. This triangular tool can be used with the point 209 to work earth close to buildings or walkways. The back end 217 can be used as a weed cutter with the triangular teeth. The long taper provides for strong and relatively sharp cutting edges, makes the tool efficient in levering clumps of earth away from the main body of earth, and helps sharpen the cutting edges. The ridge line 231 between the tapered surfaces 223 and 225 extending to the point 209 is relatively thick making the point 209 quite strong. This blade 203 again is made from steel sheet at least one-eighth inch thick.

The blades 3, 103 and 203 are preferably made from a high strength, cold forming, steel such as a steel made using sulphide shape control with direct and accelerated cooling. Such a steel allows the blades to be manufactured without heat treatment and without distortion of the blades while producing a tough and strong blade. A suitable steel is Domex®steels manufactured by Swedish Steel Domnarvet.

The blades 3, 103 and 203 could be provided with one or more sharp cutting edges if desired. A sharp cutting edge may be desirable in cutting weed roots. To avoid unduly weakening the already tapered sections adjacent the cutting edge, a second relatively short tapered section is formed in the first tapered camming section, adjacent the cutting edge, to make the cutting edge thinner than when formed by the first tapered camming section.

Figure 6:
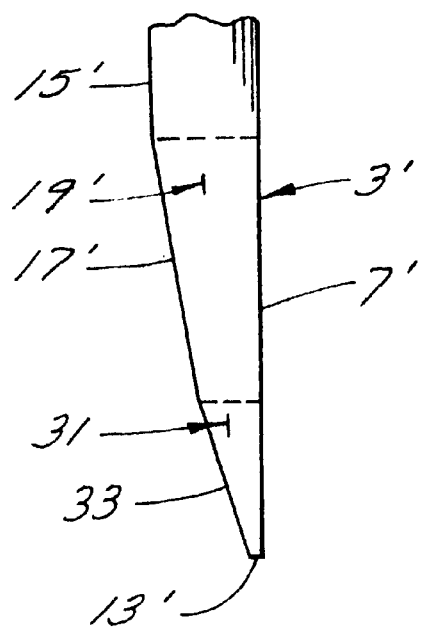
FIG. 6 is a detail side view showing a modification of a tapered camming section of a blade.
Figure 7:
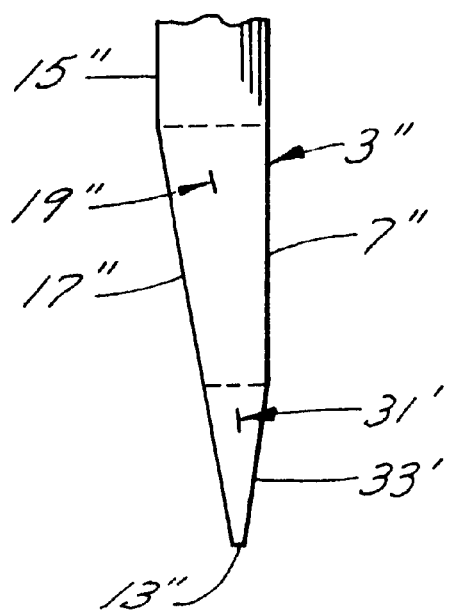
FIG. 7 is another modification similar to the modification shown in FIG. 6.

As shown in FIG. 6, the blade 3' can have a second tapered section 31 formed on the first tapered section 19', the second tapered section 31 extending up fro-m the cutting edge 13' for a distance about a third of the width of the first tapered section 19'. The second angled surface 33 forming the second tapered section 31 is an extension of the first angled surface 17' but is at a slightly sharper angle than the first surface 17' relative to the back surface 7'. The second tapered section 31 reduces the width of the cutting edge 13' making it quite sharp. However the second tapered section 31 is relatively short so that the blade is not unduly weakened in the vicinity of the cutting edge.

If desired, the second tapered section 31' can be formed by tapering the first tapered section 19" on the back surface 7" instead of on the first angled surface 17". The angled surface 33' forming the second tapered section 31' is relatively narrow compared to the width of the first angled surface 17" forming the first tapered section 19".

I claim:

1. A cultivating tool having an imperforate rectangular blade made from steel sheet at least one-eighth inch thick, connecting means on the back surface of the blade for use in connecting a handle to the blade; at least one side of the blade having a cutting edge adjacent the back surface; the blade tapered from the cutting edge to the front surface to provide a wide tapered camming section and a relatively narrow cutting edge; the tapered camming section having a width, measured from the cutting edge and in a direction transverse to the cutting edge, of at least one inch.

2. A cultivating tool as claimed in claim 1 including a relatively narrow, tapered, section formed in the wide, tapered, camming section; the narrow, tapered section being substantially narrower, in a direction measured transverse to the cutting edge, than the wide, tapered camming section, and extending from the cutting edge to make the cutting edge substantially thinner.

3. A cultivating tool as claimed in claim 2 wherein the second, tapered, section has an angled surface on the front surface of the blade.

4. A cultivating tool as claimed in claim 2 wherein the second, tapered, section has an angled surface on the back surface of the blade.

5. A cultivating tool having an imperforate blade made from steel sheet at least one-eighth inch thick, the blade having a front surface and a back surface; connecting means on the back surface of the blade for use in connecting a handle to the blade; the blade having a generally narrow, rectangular shape with one long side that is generally straight and with the other long side of the blade having teeth along its length; at least the one long straight side of the blade having a cut&g edge adjacent the back surface; the blade tapered from the cutting edge to the front surface to provide a wide tapered camming section and a relatively narrow cutting edge; the tapered camming section having a width, measured from the cutting edge and in a direction transverse to the cutting edge, of at least one inch.

6. A cultivating tool as claimed in claim 5 wherein one short side of the blade is also generally straight.

7. A cultivating tool as claimed in claim 6 wherein the other short side of the blade is deeply notched to form two narrow fingers.

8. A cultivating tool as claimed in claim 7 wherein each of the other sides of the blade also has a cutting edge adjacent the back surface; the blade on each other side tapered from the cutting edge to the front surface to provide a wide tapered camming section and a relatively narrow cutting edge; the tapered camming section on each of the other sides having a width measured from the cutting edge, and in a direction transverse to the cutting edge, of at least one inch.

9. A cultivating tool as claimed in claim 5 wherein each of the other sides of the blade also has a cutting edge adjacent the back surface; the blade on each other side tapered from the cutting edge to the front surface to provide a wide tapered calming section and a relatively narrow cutting edge; the tapered camming section on each of the other sides having a width measured from the cutting edge, and in a direction transverse to the cutting edge, of at least one inch.

10. A cultivating tool as claimed in claim 5 including a relatively narrow, tapered, section formed in the wide, tapered, camming section; the narrow, tapered section being substantially narrower, in a direction measured transverse to the cutting edge, than the wide, tapered camming section, and extending from the cutting edge to make the cutting edge substantially thinner.

11. A cultivating tool as claimed in claim 10 wherein the second, tapered, section has an angled surface on the front surface of the blade.

12. A cultivating tool as claimed in claim 10 wherein the second, tapered, section has an angled surface on the back surface of the blade.

13. A cultivating tool having an imperforate blade made from steel sheet at least one-eighth inch thick, the blade having a front surface and a back surface; connecting means on the back surface of the blade for use in connecting a handle to the blade; the blade having a pointed end defined by two diverging front sides, two short parallel back sides leading from the front sides, and a back end joining the back sides; at least one of the front sides or back end having a cutting edge adjacent the back surface; the blade tapered from the cutting edge to the front surface to provide a wide tapered camming section and a relatively narrow cutting edge; the tapered camming section having a width measured from the cutting edge, and in a direction transverse to the cutting edge, of at least one inch.

14. A cultivating tool as claimed in claim 13 wherein the other of the front sides and back end each have a cutting edge adjacent the back surface; the blade at each of the other of the front sides and back end tapered from the cutting edge to the front surface to provide a wide tapered camming section and a relatively narrow cutting edge; the tapered camming section having a width measured from the cutting edge, and in a direction transverse to the cutting edge, of at least one inch.

15. A cultivating tool as claimed in claim 13 including a relatively narrow, tapered, section formed in the wide, tapered, camming section; the narrow, tapered section being substantially narrower, in a direction measured transverse to the cutting edge, than the wide, tapered camming section, and extending from the cutting edge to make the cutting edge substantially thinner.

16. A cultivating tool as claimed in claim 15 wherein the second, tapered, section has an angled surface on the front surface of the blade.

17. A cultivating tool as claimed in claim 15 wherein the second, tapered, section has an angled surface on the back surface of the blade.

* * * * *